July 11, 1939. G. STANIUS 2,165,422
CONVEYER BELT
Filed Dec. 24, 1937 2 Sheets-Sheet 1

Inventor.
Godfrey Stanius
By Davis, Lindsey, Smith & Shonts,
Attys

July 11, 1939.   G. STANIUS   2,165,422
CONVEYER BELT
Filed Dec. 24, 1937   2 Sheets-Sheet 2
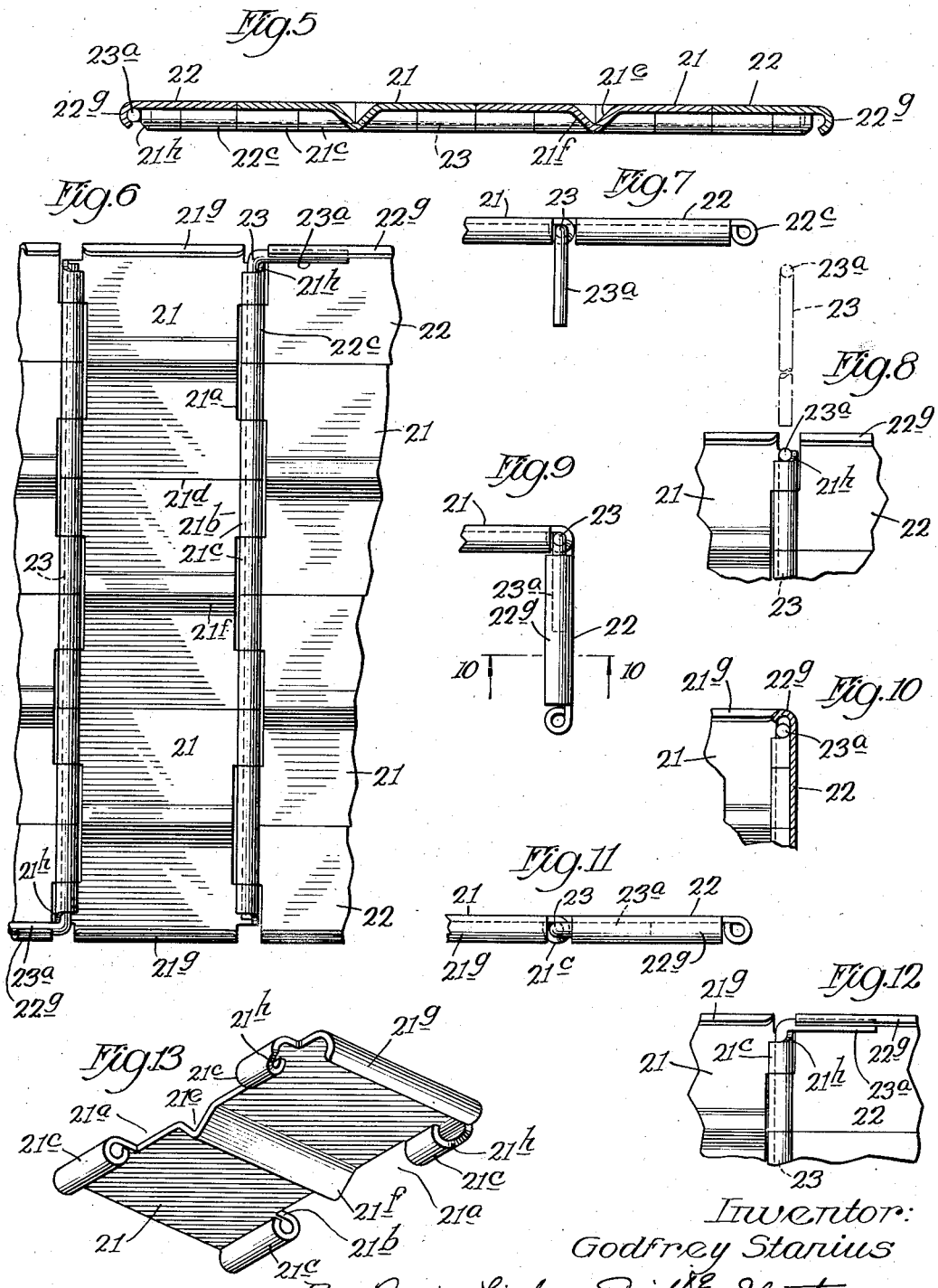

Patented July 11, 1939

2,165,422

UNITED STATES PATENT OFFICE 2,165,422

CONVEYER BELT

Godfrey Stanius, Cicero, Ill., assignor to Acme Steel Company, Chicago, Ill., a corporation of Illinois Application December 24, 1937, Serial No. 181,530

6 Claims. (Cl. 198—189)

This invention relates to improvements in conveyer belts and its purpose is to provide an improved endless belt formed by a plurality of metal plates which are pivotally connected together and adapted to form a substantially continuous surface on which loose materials may be conveyed from one location to another. The present invention is an improvement upon that described and claimed in the copending application of Chester M. MacChesney, Serial No. 87,141, filed June 25, 1936. In that application, there is disclosed a form of conveyer belt comprising a plurality of flat sheet metal plates arranged in rows transversely of the belt and having parts intermeshing with each other, the intermeshing parts being engaged by pivot pins about which adjacent rows of plates are adapted to pivot as the belt passes around the rolls on which it is supported. The principal object of the present invention is to provide improved means by which the pivot pins are retained in place after the parts of the belt have been assembled and the present invention is a modification of that described and claimed in the copending application of Allen B. Wilson, Serial No. 181,477, filed December 24, 1937. Another object of the invention is to provide a conveyer belt made up of metal plates connected by pivot pins, some of the plates and the pivot pins being provided with coacting parts which are adapted to wedge into interlocking engagement with each other when the pins are put in place. Other objects relate to various features of constructon and arrangement which will appear more fully hereinafter.

The nature of the invention will be understood from the following specification taken with the accompanying drawings in which one embodiment is illustrated. In the drawings, Figure 1 is a somewhat diagrammatic side elevation of a conveyer belt embodying the present invention with the rolls by which it is supported;

Fig. 5 shows a transverse section taken on the line 5—5 of Fig. 2;

Fig. 6 shows a partial bottom plan view of a portion of the belt illustrated in Figs. 1 and 2;

Fig. 7 is a partial side elevation of a portion of the belt shown in Figs. 2 to 6, inclusive, with one of the pivot pins in the position it occupies preliminary to being interlocked with a part of one of the plates which make up the suface of the belt;

Fig. 8 shows a partial plan view of two adjacent plates of the belt shown in Figs. 2 to 7, inclusive, with the pivot pin in the position shown in Fig. 7 and illustrating by dotted lines the position of the pivot pin before it is moved into engagement with two adjacent rows of plates;

Fig. 9 shows a side elevation similar to that of Fig. 7 illustrating the manner of effecting relative pivotal movement of two connected links in order to cause the arm of the pivot pin to move into interlocking engagement with a part of one of the plates;

Fig. 10 shows a sectional view taken on the line 10—10 of Fig. 9;

Fig. 11 is a partial side elevation of a portion of the belt after the pivot pin has been interlocked with a flange of one of the plates and after the plate has been returned to a position in a plane with the plate to which it is pivotally connected;

Fig. 12 shows a bottom plan view of the structure illustrated in Fig. 11; and

Fig. 13 shows a perspective view of one of the plates which is provided with inclined wedging surfaces causing a part of a pivot pin to move into interlocking engagement with a flange carried by an adjacent plate.

Figure 1:
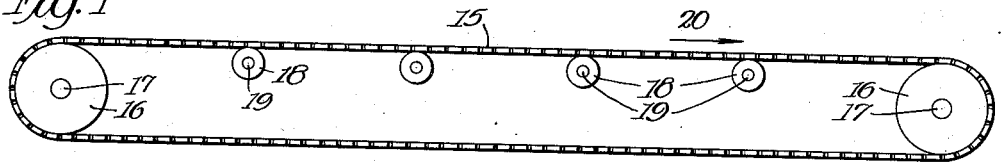

As shown in Fig. 1, the invention is embodied in an endless conveyer belt 15 which is mounted upon supporting rolls 16 carried by shafts 17 having bearings which are not illustrated. The upper stretch of the belt is supported by idler rolls 18 carried by shafts 19 which are mounted in suitable bearings and one of the shafts 17 is adapted to be driven from a source of power to cause the upper stretch of the belt to move in the direction of the arrow 20, for example, for the purpose of conveying the loose materials which are discharged onto the belt by any suitable means. The belt is made up primarily of a plurality of sheet metal plates 21 arranged in rows transversely of the belt and supplemented at the ends of alternate rows by auxiliary plates 22 each of which is formed substantially like one-half of one of the plates 21. The rows of metal plates are connected together by pivot pins 23 each of which has a transversely extending arm 23$^a$ adapted to interlock with a flange carried by one of the plates at the end of a row so that the pivot pins are prevented from being accidentally withdrawn after the parts of the belt have been assembled.

Each plate 21 comprises a body portion having opposite rectangular notches 21$^a$ in its edges, forming tongues 21$^b$ which have their ends curled to form cylindrical bearing portions 21$^c$ adapted to be engaged by the pins 23. The plates 21 are staggered with respect to each other in adjacent rows and they intermesh with each other so that each notch 21$^a$ in a plate is occupied by two of the bearing portions 21$^c$ carried by an adjacent plate. The ends 21$^d$ of the plates are adapted to abut against each other in the same row and each plate 21 is provided at its middle point with a longitudinally extending groove 21e formed by a downwardly extending V-shaped rib 21f. These ribs are adapted to bear upon the rolls 16 and 18 so that the belt is prevented from assuming an undulating motion as it passes over the rolls, the lower edges of the rib 21f being in substantial alignment with the lower edges of the bearing portions 21c. The plates 21, at the ends of the rows which are made up entirely of such plates, are provided with downwardly turned curved flanges 21g, in the form shown particularly in Fig. 13 and the bearing portions 21c adjacent these flanges are provided with inclined wedging surfaces 21h at their outer ends for coaction with the arms 23a of the pivot pins, in the manner hereinafter described.

Due to the staggered relationship of the plates 21 in adjacent rows, the alternate rows of plates 21 are shorter than the intermediate rows and these shorter rows are filled out at their ends by the plates 22, each of which comprises a flat body portion having angular notches 22a at the outer corners thereof and having opposite longitudinally extending flanges or projections 22b at the inner corners thereof, these projections 22b being curled downwardly to form cylindrical bearing portions 22c which are similar in size and arrangement to the bearing portions 21c and which are adapted to be engaged by the pivot pins 23. The plates 22 are provided at their outer ends with downwardly extending curved flanges 22g which are similar in form to and aligned with the flanges 21g on those plates 21 which are located at the ends of the adjacent rows. The aligning flanges 21g and 22g thus provide a substantially smooth outer edge surface for the belt so that the belt may contact with side guides, for example, without damage to any of the parts.

Figure 2:
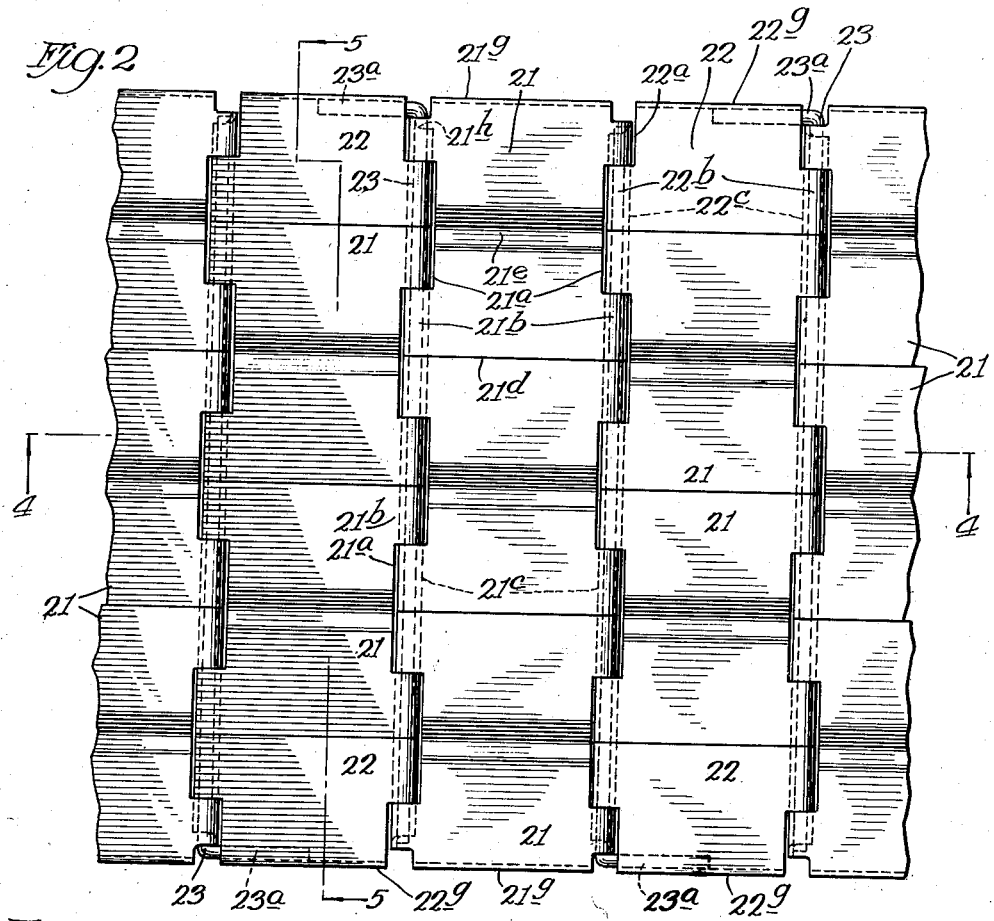
Fig. 2 shows an enlarged top plan view of a portion of the conveyer belt illustrated in Fig. 1.
Figure 3:
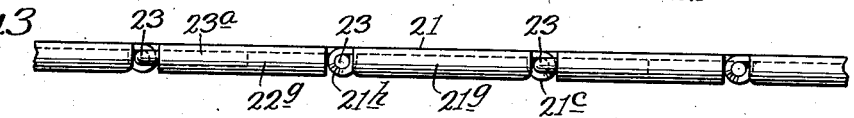
Fig. 3 shows a side elevation of the portion of the belt illustrated in Fig. 2.
Figure 4:
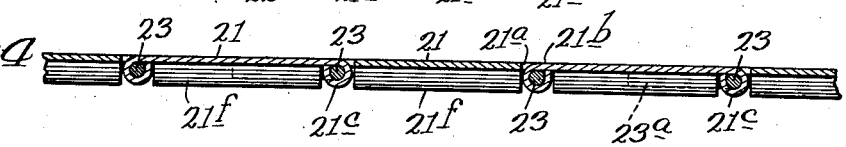
Fig. 4 shows a longitudinal section taken on the line 4—4 of Fig. 2.

In the assembly of the belt, adjacent rows of plates 21 and 22 are arranged with their bearing portions intermeshing with each other and one of the pivot pins 23 is then inserted through the aligning bearing portions for the purpose of pivotally connecting the adjacent rows of plates. When the pin 23 is first inserted from the position shown by dotted lines in Fig. 8 to the position shown by full lines in Figs. 7 and 8, the plates of the two adjacent rows connected by the pin are extended in the same plane and the arm or handle 23a of the pin is directed at right angles to that plane and is in contact with the flat end face of one of the bearing portions 21c on which one of the inclined wedging surfaces 21h is formed. One row of plates, which do not have the cam surfaces 21h, is then turned through ninety degrees to the position shown in Figs. 9 and 10 which brings the arm 23a into position against the face of one of the plates 22 and in line with the curved flange 22g thereon. If the arm 23a is then held against the face of this plate 22, and the two rows of plates are moved relatively to occupy the same plane again, as shown in Figs. 11 and 12, the inclined wedging surface 21h will coact with the arm 23a to force it into a position beneath and interlocking with the somewhat resilient flange 22g, thus holding the pin securely in position. If the withdrawal of any of the pins 23 is desired, that may be effected by moving the two connected rows of plates into relative right angular positions again, pushing the arm 23a out from beneath the flange 22g and reversing the process of assembly. In putting the pins 23 in place, the arms 23a of adjacent pins are preferably located at opposite sides of the belt and they are extended in opposite directions longitudinally of the belt so that two adjacent pins interlock with the flanges 22g on plates 22 at opposite ends of the same row, as illustrated in Fig. 2.

Although one form of the improved conveyer belt, made up of sheet metal plates and connecting pivot pins, has been shown and described by way of illustration, it will be understood that it may be constructed in various other embodiments coming within the scope of the appended claims.

I claim:

1. A conveyer belt comprising a plurality of metal plates arranged in parallel transverse rows, and pivot pins each connecting the plates of two adjacent rows, said plates having parts adapted to interlock with portions of said pins and having other parts adapted to wedge said portions of said pins into interlocking engagement with said first named parts.

2. A conveyer belt comprising a plurality of metal plates arranged in parallel transverse rows, and pivot pins each connecting the plates of two adjacent rows, certain of said plates having parts adapted to interlock with portions of said pins, other plates having parts to coact with said pins to force said pins into interlocking engagement with said first named parts upon relative motion of said plates and said pins.

3. A conveyer belt comprising a plurality of metal plates arranged in parallel transverse rows, and pivot pins each connecting the plates of two adjacent rows, said plates having parts adapted to interlock with portions of said pins and having inclined wedging surfaces adapted to coact with said portions of said pins to force said pins into interlocking engagement with said parts upon relative angular motion of the plates in adjacent rows.

4. A conveyer belt comprising a plurality of metal plates arranged in parallel transverse rows, and pivot pins each connecting the plates of two adjacent rows, certain of said plates having grooved flanges formed thereon, said pins having transverse arms, some of said plates having surfaces adapted to coact with said arms upon relative rotation of those plates and said pins to cause said arms to engage said grooves.

5. A conveyer belt comprising a plurality of metal plates arranged in parallel transverse rows, said plates in adjacent rows having parts intermeshing with each other, and pivot pins engaging said intermeshing parts for pivotally connecting adjacent rows, said pins having angularly disposed arms, some of said plates having parts adapted to interlock with said arms to prevent the removal of said pins, some of said intermeshing parts having inclined surfaces adapted to engage said arms to force them into interlocking engagement with said parts upon relative rotation of those plates and said pins.

6. A conveyer belt comprising a plurality of metal plates arranged in parallel transverse rows, said plates in adjacent rows having intermeshing cylindrical bearing portions, and pivot pins each engaging the intermeshing bearing portions of two adjacent rows, said pins having angularly disposed arms, some of said plates having flanges adapted to interlock with said arms, some of said bearing portions being provided at their ends with cam surfaces adapted to be engaged by said arms for forcing said arms into interlocking engagement with said surfaces on relative rotation of said arms.

GODFREY STANIUS.